Aug. 8, 1967 — M. MERZ — 3,334,670

BEARING ASSEMBLY FOR A CHAIN SAW

Filed March 4, 1965 — 4 Sheets-Sheet 1

Inventor:
Max Merz
By: Herman E. Smith

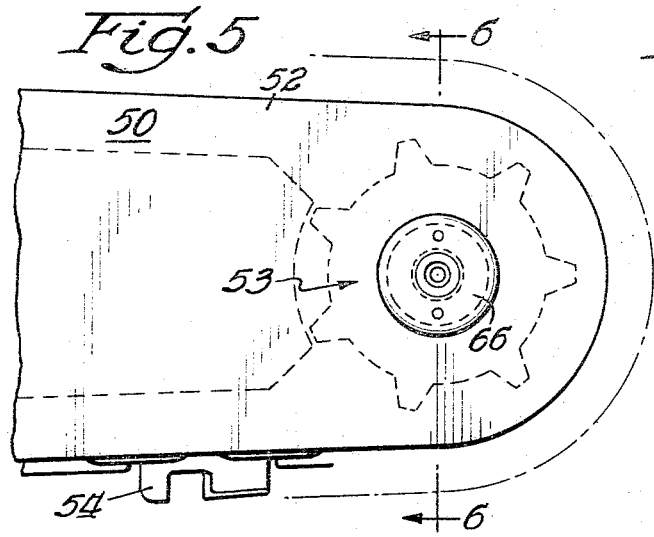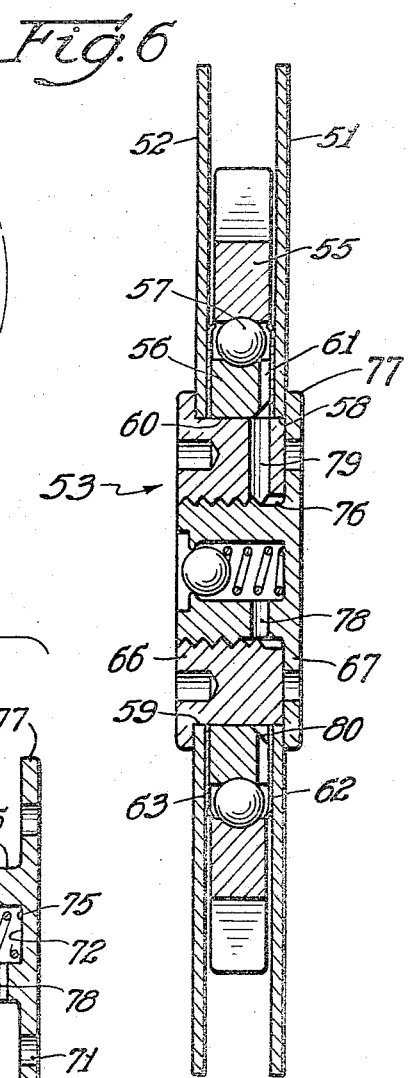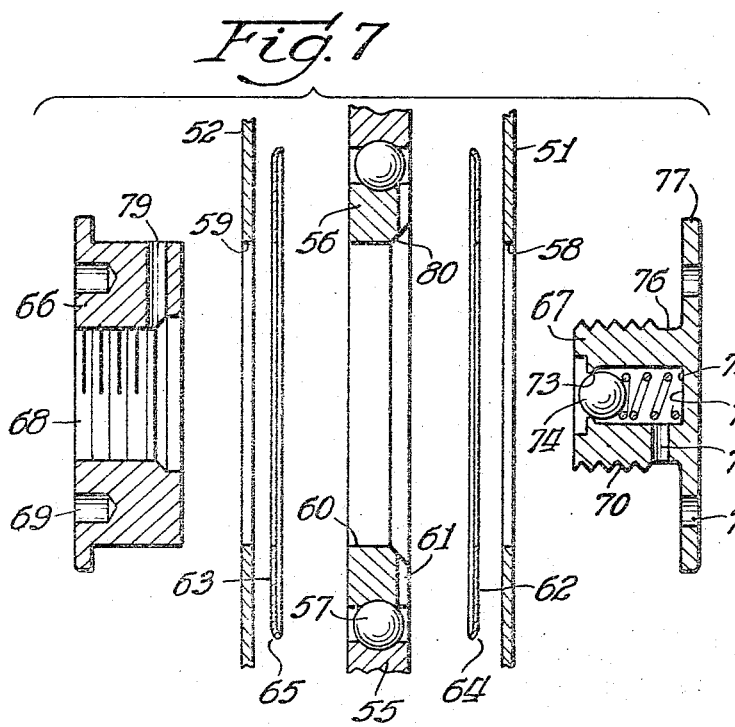

Aug. 8, 1967  M. MERZ  3,334,670
BEARING ASSEMBLY FOR A CHAIN SAW
Filed March 4, 1965  4 Sheets-Sheet 3

Inventor:
Max Merz
By: Herman E. Smith Atty.

Aug. 8, 1967    M. MERZ    3,334,670
BEARING ASSEMBLY FOR A CHAIN SAW
Filed March 4, 1965    4 Sheets-Sheet 4
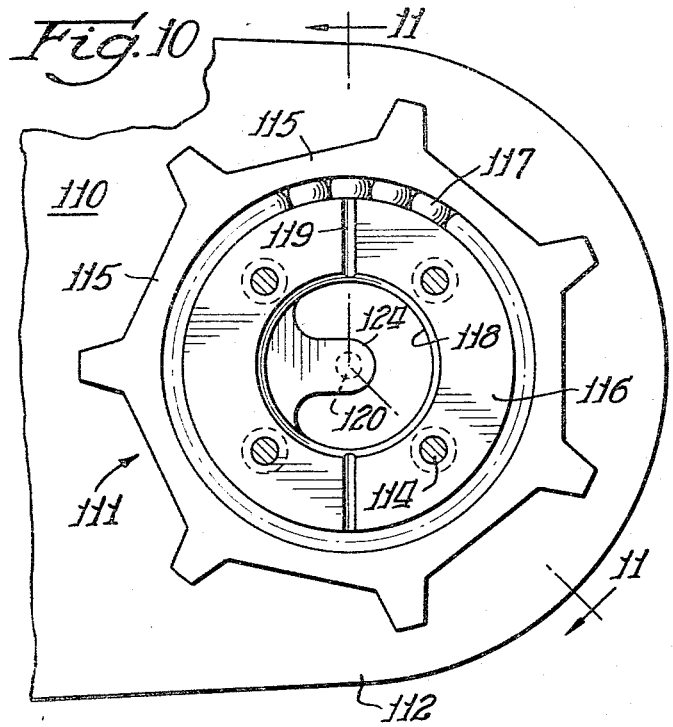
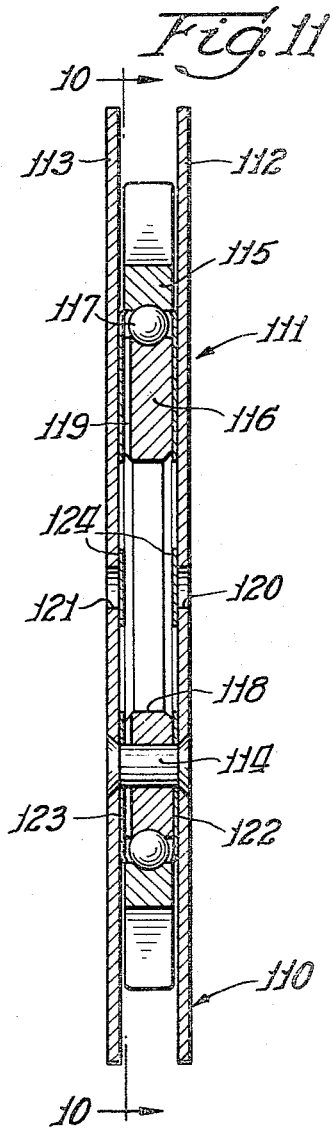
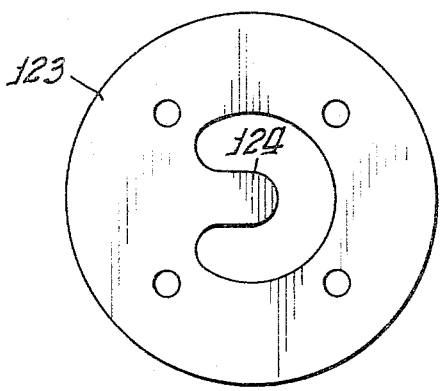
Inventor:
Max Merz
By: Herman E. Smith

United States Patent Office 3,334,670
Patented Aug. 8, 1967

3,334,670
BEARING ASSEMBLY FOR A CHAIN SAW
Max Merz, Los Angeles, Calif., assignor, by mesne assignments, to Nicholson File Company, East Providence, R.I., a corporation of Rhode Island
Filed Mar. 4, 1965, Ser. No. 437,201
6 Claims. (Cl. 143—32)

This invention relates generally to power chain saws, and more particularly, to a rotatable idler mounted in the cutter bar thereof.

The widespread use of power chain saws has resulted in a demand for smaller, lightweight, portable, one-man operated machines. This in turn, has resulted in improved engine designs which provide increased power per unit of weight. The improvements to engines has resulted in a demand for more efficient saw tooth designs to make use of the available power. This combination has resulted in the application of smaller machines to larger jobs, which once would have required a much larger and more massive machine. This concentration of power imposes severe loading conditions on the cutter bar and its associated parts resulting in a high rate of frictional wear, distortion and the like.

For example, a small portable power saw, used for "boring," can fell a tree having a trunk diameter approximately twice the effective cutter bar length. In "boring," the cutter bar is thrust longitudinally into the tree trunk and then moved around to completely sever the trunk. Normally, the tip of the blade has a load imposed upon it which is equal to twice the chain tension. When the bar is used for boring, the tip of the bar must withstand the thrust forces in addition to those imposed by the chain tension.

Various attempts have been made to counteract the effects of wear imposed by this combination of forces. For example, the bar itself may have hard surfacing applied to the tip in the zone where extreme wear occurs. This is objectionable in that the wearing surfaces of the chain and tip are subject to sliding friction, and further in that the high loading causes pitting and cracking with resulting destruction of portions of the bar that provided a quick track for the chain.

Bearing assemblies have been provided in the larger cutter bars to avoid some of the above mentioned difficulties. These bearings have been of large, massive construction too large for use in the smaller, lightweight machines, while smaller bearings have been too difficult to maintain and too delicate and fragile to adequately handle the loads.

Accordingly, it is an object of the present invention to provide an improved bearing assembly for absorbing the thrust forces and transferring them to a portion of the bar remote from the edge.

Another object is to provide low friction reversal of the orbitally moving cutter chain.

A further object is to provide means for lubricating a chain reversal idler.

A still further object is to provide a readily dismantleable idler assembly for quickly cleaning out dirt, sap, rosin, saw dust and the like.

This invention consists of the novel constructions, arrangements, and devices hereinafter described and claimed for carrying out the abovestated objects and such other objects as will appear from the following description of a preferred form and alternative constructions of the invention illustrated with reference to the accompanying drawings.

In the drawings:

FIGURE 5 is a plan view of an alternate construction;

FIGURE 6 is a section view, to enlarged scale, taken along the line 6—6 of FIGURE 5;

FIGURE 7 is an "exploded" view of the alternate construction shown in FIGURES 5 and 6;

FIGURE 10 is a plan view of a further alternate construction looking in the direction of the arrows 10—10 of FIGURE 11;

FIGURE 11 is a section view taken along the line 11—11 of FIGURE 10; and

FIGURE 12 is a view of a shim particularly adapted for use with the construction shown in FIGURES 10 and 11.

Figure 1:
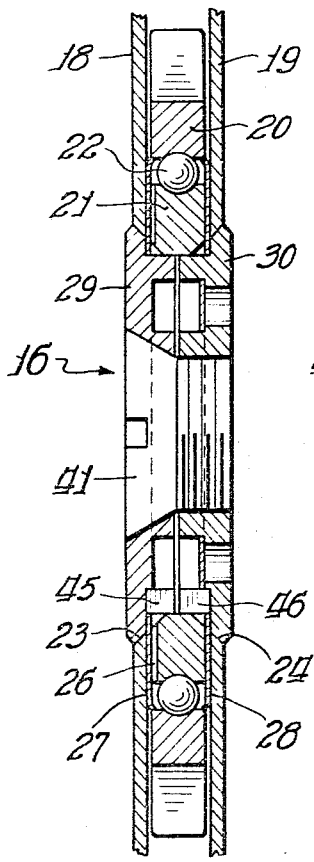
FIGURE 1 is a section view of a bearing assembly according to the present invention.

Referring now to the drawings and particularly to FIGURES 1-4 thereof, there is shown a chain saw cutter bar 15, incorporating a preferred form of the improved removable idler assembly 16. The cutter bar and idler are adapted to provide a track for supporting and guiding cutter chain 17. Cutter bar 15 comprises a pair of spaced plates 18 and 19 separated by a spacer 15a indicated in dotted lines in FIGURE 3. Idler assembly 16 is also embraced between plates 18 and 19 and includes an outer race member 20 rotatable on an inner race member 21. An antifriction bearing device 22 is mounted between the inner and outer members to reduce the rotational friction. The idler assembly 16 performs at least three functions including: (1) the anti-friction support of the outer loop of the chain; (2) the spacing apart of the end portions of plates 18 and 19; and (3) the provision of lubricant supply means for the anti-friction bearing.

Figure 2:
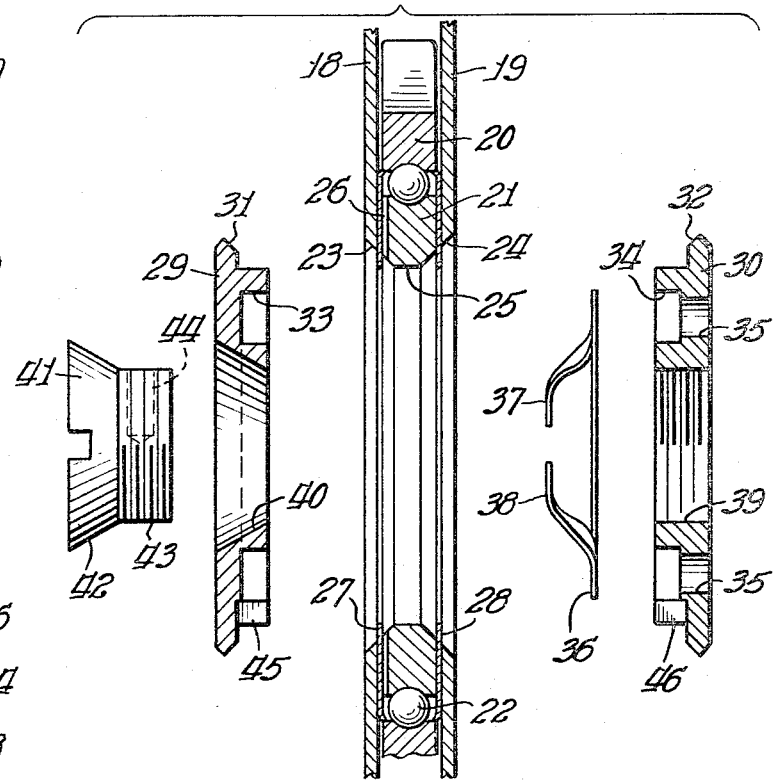
FIGURE 2 is an "exploded" view of the assembly shown in FIGURE 1 having the various elements spread apart for easy identification.
Figure 3:
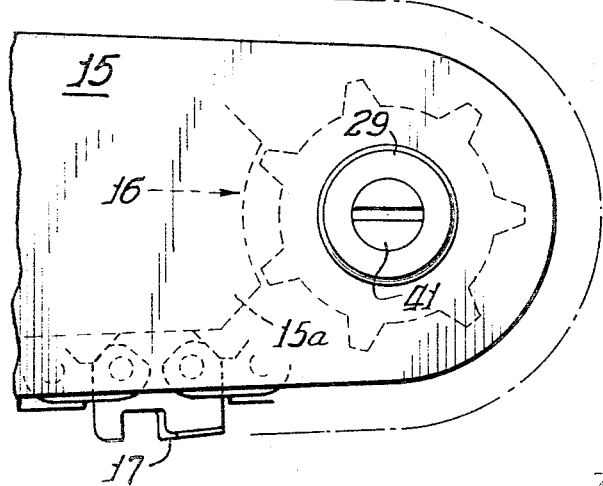
FIGURE 3 is a view of the assembly shown in FIGURE 1 mounted in a cutter bar.
Figure 4:
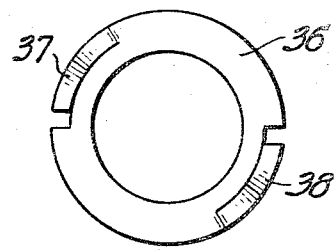
FIGURE 4 is a plan view of the spring shown in FIGURE 2.

As shown particularly in FIGURES 1 and 2, plates 18 and 19 are provided with aligned apertures 23 and 24. Inner member 21 is provided with an aperture 25 which is coaxially alignable with the apertures in the spaced plates. Inner member 21 is provided with one or more grooves 26 forming a radially extending passage between its aperture 25 and the interface between members 20 and 21 or the bearing device 22. A pair of shims 27 and 28 are disposed between opposite faces of inner member 21 and a respective plate and extend outwardly into close proximity with outer member 20. These shims precisely locate idler assembly 16 between plates 18 and 19 to provide running clearance between outer member 20 and the plates while at the same time, providing a lubricant seal for bearing 22. In addition, shim 27 covers groove 26 to form an enclosed passage.

A pair of cooperating mounts 29 and 30 have beveled surfaces 31 and 32 adapted to cooperate with apertures 23 and 24 for positioning the idler assembly 16 in the cutter bar 15. Mounts 29 and 30 are provided with annular recesses 33 and 34 which form a fluid reservoir when assembled. One or more access apertures 35 communicate with the reservoir to permit the introduction of a lubricant. An annular spring 36 is proportioned to fit loosely in the annular recess 34 and has fingers 37 and 38 engageable with the bottom of recess 33. This provides a resilient cover, or valve, for closing aperture 35 against the entrance of dirt and other foreign matter.

Mount 30 is provided with an internally threaded portion 39 which is aligned with a tapered opening 40 in mount 29. A screw 41 having a tapered head 42 and a threaded portion 43 is engageable with mounts 29 and 30 for drawing them together to tightly clamp inner member 21 between plates 18 and 19. Screw 41 is provided with plastic insert 44 for locking it in engagement with the threaded portion of mount 30. Mounts 29 and 30 are also provided with slots 45 and 46 which communicate the reservoir with groove 26 in inner member 21. Thus is provided a readily dismantleable idler assembly which includes an easily accessible lubricant reservoir in communication with the idler bearing.

Referring now to FIGURES 5, 6 and 7, an alternate construction incorporating the novel features of the present invention is shown.

The cutter bar 50 has a pair of spaced plates 51 and 52 which enclose an idler assembly 53 and a saw chain 54. Idler assembly 53 includes an outer rotatable member 55 mounted for rotation on an inner member 56 and may include an anti-friction bearing device 57. Plates 51 and 52 are provided with aligned apertures 58 and 59. Inner member 56 has an aperture 60 which is coaxially alignable with apertures 58 and 59 in the plates. Inner member 56 is provided with at least one radial groove 61 extending from its aperture 59 to the bearing device 57. A pair of shims 62 and 63 are assembled between opposite faces of inner member 56 and plates 51 and 52. These shims serve to accurately space idler assembly 53 between plates 51 and 52 to provide running clearance between outer member 55 and the plates.

As shown more particularly in FIGURES 6 and 7, shims 62 and 63 are provided with inturned lips 64 and 65 extending around the perimeter. These lips, turned inwardly and lying in close proximity to outer member 55, provide an effective lubricant seal for bearing device 57.

A pair of mounts 66 and 67 are provided for clamping idler assembly 53 between plates 51 and 52. Mount 66 is provided with an internally threaded portion 68 and spanner wrench holes 69. Mount 67 is provided with a cooperating externally threaded portion 70 and similar spanner wrench holes 71. Mount 67 is also provided with a reservoir 72 which has an access aperture 73 closed by the action of ball check valve 74 and spring 75. Mount 67 has an annular groove 76 located between the end of threaded portion 70 and flange portion 77 which communicates with reservoir 72 through channel 78. Mount 66 includes a channel 79 communicating with groove 76 and with chamfer 80 in inner member 56. When mounts 66 and 67 are assembled together to clamp idler assembly 53 between plates 51 and 52, a lubrication path is established between reservoir 72 and bearing device 57 through channel 78, annular groove 76, channel 79, chamfer 80, and groove 61.

Figure 8:
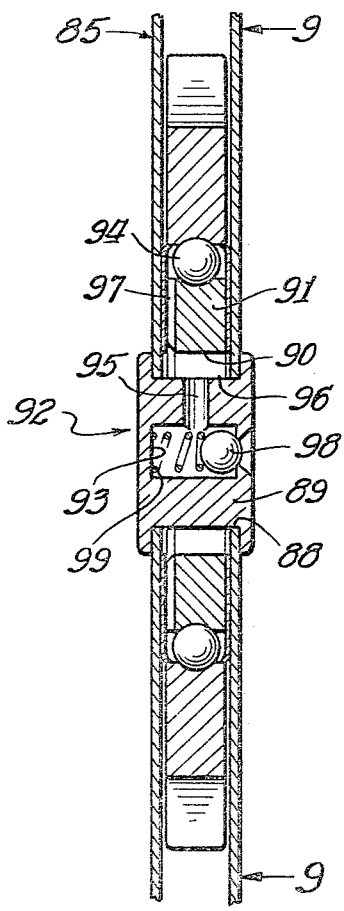
FIGURE 8 is a section view of a further alternate construction.
Figure 9:
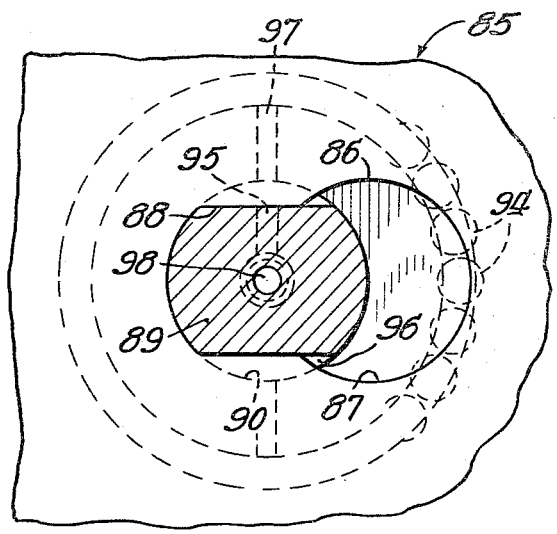
FIGURE 9 is a view, partially in section, looking in the direction of the arrows 9—9 of FIGURE 8.

A further alternate construction is shown in FIGURES 8 and 9, wherein the cutter bar 85 is provided with a keyhole aperture 86 having a circular portion 87 intersecting a guide portion 88. A slotted mount 89 is assembled through circular portion 87 and aperture 90 in inner member 91 after which idler assembly 92 and mount 89 are slid into guide portion 88 of keyhole 86 to accurately position idler assembly 92 in the bar 85.

Slotted mount 89 is provided with a reservoir 93 which communicates with bearing 94 through channel 95, slotted potrion 96, and groove 97. Reservoir 93 is sealed against the entrance of dirt and other foreign matter by ball check valve 98 and spring 99.

While I have shown and described a preferred embodiment of my invention, together with alternate forms thereof which comprehend a readily dismantleable idler assembly, many of the novel features thereof may also find use in a permanently connected idler assembly such as shown in FIGURES 10 and 11. A cutter bar 110 has an idler assembly 111 riveted between plate 112 and 113 by rivets 114. An outer member 115 is mounted for rotation on inner member 116 by means of bearing device 117. Inner member 116 is provided with an internal cavity 118 and a groove 119 communicating the cavity with bearing device 117. Plates 112 and 113 may have access apertures 120 and 121 communicating with cavity 118. Shims 122 and 123 are provided for positioning idler assembly 111 between plates 112 and 113, while providing a lubricant seal for bearing device 117 as hereinbefore described.

As shown particularly in FIGURE 12, one or both of shims 122 and 123 may be provided with a lanced portion 124 in register with aperture 120 or 121. Cavity 118 provides a lubricant reservoir communicating with bearing 117 through groove 119. In addition to providing proper spacing of the idler assembly and lubricant sealing around bearing 117, the shims through lanced portion 124 also provide a resilient cover flap providing access for filling the reservoir with lubricant, but preventing the entrance of dirt, and other foreign matter.

Thus I have shown and described a small but rugged anti-friction idler assembly capable of supporting a highly loaded cutter chain under severe operating conditions which at the same time is easy to lubricate and can be quickly dismantled for cleaning.

While I have shown and described a preferred embodiment of my invention, together with various modifications and alternative constructions thereof, it is to be understood that other forms and modifications may be comprehended within the spirit of the invention and the scope of the following claims.

What is claimed is:

1. In a chain saw cutter bar having a pair of spaced plates providing a track for guiding a cutter chain, the improvement comprising; means defining an idler insertable between said plates, said idler having concentric inner and outer ring members; said outer ring member adapted to rotate on said inner ring member while supporting a cutter chain on its outer surface; fastening means engaged with said inner ring member and said plates securing said inner ring member against rotation with respect to said plates while providing running clearance between said outer ring member and said plates, a lubricant reservoir communicating with the interface between said inner and outer members, and a pair of circular shims, each disposed between a face of said inner member and a respective plate, said shims extending radially outwardly in close proximity to said outer member sealing the interface between said inner and outer members against escape of lubricant therefrom while providing running clearance between the outer rotatable member and the spaced plates.

2. The structure of claim 1 in which each of said shims has a lip extending around its perimeter, the pair of shims being assembled with their lips facing inwardly toward each other.

3. The structure of claim 1 in which said lubricant reservoir is provided with an access aperture, and in which at least one of said shims has a lanced portion extending into register with and overlapping said aperture;
said lanced portion providing a resilient cover for said aperture.

4. The structure of claim 1, said plates including aligned apertures disposed near an end of said bar, said inner member including an aperture alignable with the apertures in said plates, said fastening means including first and second idler mounts extending through respective plate apertures into engagement with said inner member, said mounts defining an internal cavity providing said lubricant reservoir, and said fastening means securing said mounts to said plates and securing said inner member against rotation with respect to said plates.

5. The structure of claim 1, said plates including aligned keyhole apertures disposed near an end of said bar, said inner member including an aperture alignable for registration with one portion of said keyhole aperture, said fastening means comprising a slotted idler mount insertable through said one portion of the keyhole aperture in said plates and through said inner member, said mount being slidable together with said inner member into engagement with the other portion of said keyhole apertures to position the idler in said bar.

6. The structure of claim 1, said idler having bearing means engaged between said inner and outer members, said inner member being of annular configuration and including a groove extending radially between its inner and outer surfaces, said lubricant reservoir communicating with said groove in said inner member, said shims extending radially outwardly overlapping said bearing means in close proximity to said outer member, each of said shims providing a seal against escape of lubricant from said bearing means while providing running clearance between the outer rotatable member and the spaced plate.

References Cited
UNITED STATES PATENTS

| | | | |
|---|---|---|---|
| 2,888,964 | 6/1959 | Mall | 143—32 |
| 3,124,177 | 3/1964 | Ekrud | 143—32 |
| 3,263,715 | 8/1966 | Dobbertin | 143—32 |

DONALD R. SCHRAN, *Primary Examiner.*